United States Patent

Chan et al.

(10) Patent No.: US 9,191,990 B2
(45) Date of Patent: Nov. 17, 2015

(54) SYSTEM AND METHOD FOR CROSS-LAYER ENCAPSULATION MESSAGING

(75) Inventors: Hinghung Anthony Chan, Plano, TX (US); Jung Hoon Jee, Seoul (KR)

(73) Assignees: Futurewei Technologies, Inc., Plano, TX (US); Electronics and Telecommunications Research Institute, Daejeon (KR)

( * ) Notice: Subject to any disclaimer, the term of this patent is extended or adjusted under 35 U.S.C. 154(b) by 577 days.

(21) Appl. No.: 13/612,682

(22) Filed: Sep. 12, 2012

(65) Prior Publication Data

US 2013/0070673 A1  Mar. 21, 2013

Related U.S. Application Data

(60) Provisional application No. 61/535,787, filed on Sep. 16, 2011.

(51) Int. Cl.
| | |
|---|---|
| *H04W 4/00* | (2009.01) |
| *H04W 88/06* | (2009.01) |
| *H04W 36/14* | (2009.01) |

(52) U.S. Cl.
CPC .............. *H04W 88/06* (2013.01); *H04W 36/14* (2013.01)

(58) Field of Classification Search
CPC ..... H04W 88/00; H04W 88/06; H04W 36/00; H04W 36/14; H04W 36/0016; H04W 36/005; H04W 36/18
USPC .......................................... 370/331, 332, 328
See application file for complete search history.

(56) References Cited

U.S. PATENT DOCUMENTS

| | | | |
|---|---|---|---|
| 6,169,729 B1 | 1/2001 | Feuerstraeter | |
| 2007/0197214 A1 | 8/2007 | Faccin et al. | |
| 2008/0273500 A1 | 11/2008 | Suh et al. | |
| 2009/0147752 A1* | 6/2009 | Chung et al. ................... | 370/331 |
| 2010/0054207 A1 | 3/2010 | Gupta et al. | |
| 2011/0158161 A1* | 6/2011 | Jain ................................. | 370/328 |
| 2012/0177003 A1* | 7/2012 | Chan et al. .................... | 370/331 |

FOREIGN PATENT DOCUMENTS

EP        1180292 B1      10/2006

OTHER PUBLICATIONS

Chan, A. C., et al., "TGc_Proposal_Charles_Perkins," 21-10-0073-00-srho-proposal, IEEE 802.21 Media Independent Handover Services, IEEE 802.21c: Single Radio Handover, Task Group Discussion and Acceptance, Jul. 19, 2012, 93 pages.

(Continued)

*Primary Examiner* — Kwang B Yao
*Assistant Examiner* — Syed M Bokhari
(74) *Attorney, Agent, or Firm* — Slater & Matsil, LLP

(57) ABSTRACT

A method for mobile node operations includes communicating with a first point of attachment in a first radio network through a radio interface tuned to the first radio network, and encapsulating a first frame in a second radio network format within a media independent control frame. The method also includes transmitting the media independent control frame with the first frame in the second radio network format encapsulated therein to a second point of attachment in a second radio network using the radio interface tuned to the first radio network.

30 Claims, 9 Drawing Sheets

(56) References Cited

OTHER PUBLICATIONS

International Search Report and Written Opinion of Patent Cooperation Treaty (PCT), International Application No. PCT/US12/55770, Applicants Huawei Techologies Co., Ltd., date of mailing Jan. 4, 2013, 9 pages.

Interworking Task Group of IEEE 802.1 LAN/MAN Standards Committee of the IEEE Computer Society, IEEE Draft Standard for Local and Metropolitan Area Networks: Ovcerview and Architecture, P802-REV/D1.3, 2011, 66 pages, IEEE, New York, US.

* cited by examiner

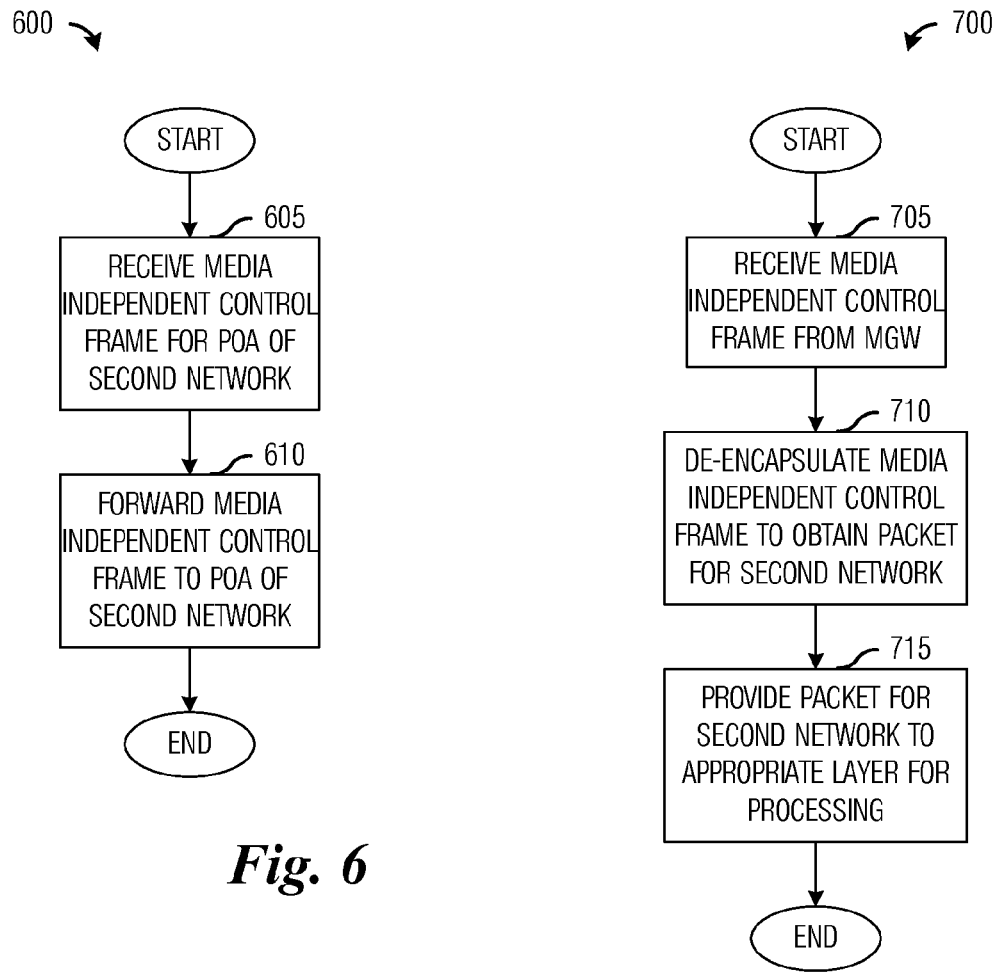

SYSTEM AND METHOD FOR CROSS-LAYER ENCAPSULATION MESSAGING

This application claims the benefit of U.S. Provisional Application No. 61/535,787, filed on Sep. 16, 2011, entitled "System and Method for Cross-Layer Encapsulation Messaging," which application is hereby incorporated herein by reference.

TECHNICAL FIELD

The present disclosure relates generally to digital communications, and more particularly to a system and method for cross-layer encapsulation messaging.

BACKGROUND

The drive for wireless communications is to allow for greater levels of roaming and allow seamless roaming. Myriad issues, such as handoff between providers, authentication, communication system capabilities and limitations, become increasingly important when roaming, particularly when global roaming is contemplated.

When a mobile node (MN) (also commonly referred to as a mobile station, a subscriber, a user, a terminal, a User Equipment (UE), and the like) moves from an area covered by one network and enters another area covered by another network the call preferably is transferred to the second network without dropping the connection or losing packets. In cellular telecommunications, the term handover or handoff refers to the process of transferring an ongoing call or data session from one channel connected to the core network to another. This function can be referred to as handover with fast mobility.

The term handover or handoff may also apply to when a MN changes from one channel connected to the core network via a first communications controller (also commonly referred to as a base station, a controller, a base terminal station, a NodeB, an enhanced NodeB, and the like) to a second communications controller. Similarly, when a MN is powered on in a new location served by a different network than an immediately preceding network used by the MN, the wireless communications network must recognize the change in location of the MN and direct to the new network the information destined to the MN. This can be referred to as handover with slow mobility.

As more different types of access networks become available, a goal of equipment manufacturers has been to produce a single MN that is capable of operating in multiple access interfaces. These MNs may commonly be referred to as multi-mode MNs, multi-mode phones, global phones, and the like. In order to support multiple access networks, these MNs may have multiple transmit radios to allow for simultaneous access to more than one access network.

Existing methods to perform handover are primarily dual-radio handovers. Dual-radio handover generally requires high peak power consumption capability and sharp signal filtering in the MN due to the use of two or more radios.

SUMMARY OF THE DISCLOSURE

Example embodiments of the present disclosure which provide a system and method for cross-layer encapsulation messaging.

In accordance with an example embodiment of the present disclosure, a method for mobile node operations is provided. The method includes communicating with a first point of attachment in a first radio network through a radio interface tuned to the first radio network, and encapsulating a first frame in a second radio network format within a media independent control frame. The method also includes transmitting the media independent control frame with the first frame in the second radio network format encapsulated therein to a second point of attachment in a second radio network using the radio interface tuned to the first radio network.

In accordance with another example embodiment of the present disclosure, a method for operating a point of attachment in a second radio network is provided. The method includes receiving a media independent control frame with a first frame in a second radio network format encapsulated therein, wherein the media independent control frame is received from a mobile node having a radio interface tuned to a first radio network. The method also includes de-encapsulating the media independent control frame to obtain the first frame.

In accordance with another example embodiment of the present disclosure, a mobile node is provided. The mobile node includes a receiver, a transmitter, and a processor operatively coupled to the receiver and to the transmitter. The receiver communicates with a first point of attachment in a first radio network through a radio interface tuned to the first radio network. The transmitter communicates with the first point of attachment in the first radio network through the radio interface tuned to the first radio network, and transmits a media independent control frame with a first frame in a second radio network format encapsulated therein to a second point of attachment in a second radio network using the radio interface tuned to the first radio network. The processor encapsulates the first frame in the second radio network format within the media independent control frame.

One advantage of an embodiment is that the use of a single radio reduces power consumption requirements of a MN, which helps to improve battery life of a MN. Additionally, signal filtering requirements are relaxed, allowing the use of less complex filters.

A further advantage of an embodiment is that cross-layer signaling is allowed between any two devices operating in different radio networks with a single active radio connection between the two devices.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 6 illustrates an example flow diagram of operations in a MGW as the MGW participates in communications with a MN as the MN communicates with POAs in a first radio access network and a second radio access network through a single radio interface with a single active radio connection according to example embodiments described herein;

FIG. 7 illustrates an example flow diagram of operations in a target POA as the target POA participates in communications with a MN as the MN communicates with POAs in a first radio access network and a second radio access network through a single radio interface with a single active radio connection according to example embodiments described herein.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to cross-layer encapsulation messaging. For example, at a mobile node, the mobile node communicates with a first point of attachment in a first radio network through a radio interface tuned to the first radio network, and encapsulates a first frame in a second radio network format within a media independent control frame. The mobile node also transmits the media independent control frame with the first frame in the second radio network format encapsulated therein to a second point of attachment in a second radio network using the radio interface tuned to the first radio network.

The present disclosure will be described with respect to example embodiments in a specific context, namely a wireless communications system supporting multiple radio access systems, such as 3GPP, 3GPP2, 3GPP EPC, WiMAX, WLAN, WiFi, and the like.

Figure 1:
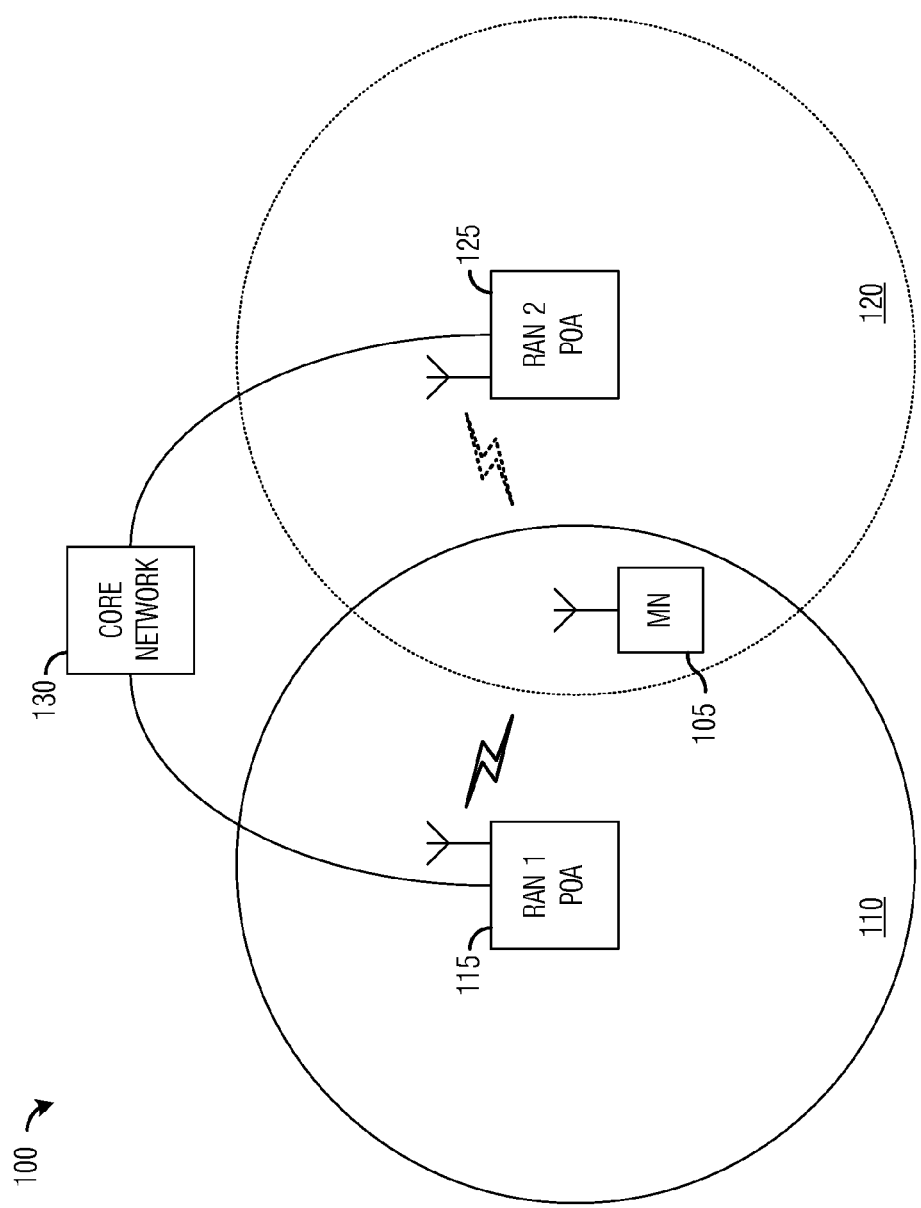
FIG. 1 illustrates an example communications system according to example embodiments described herein.

FIG. 1 illustrates a communications system 100. Communications system 100 includes a MN 105 operating in a coverage area 110 of a first radio access network (RAN) point of attachment (POA) 115, shown as RAN 1 POA 115. MN 105 accesses services through RAN 1 POA 115, receives transmissions from RAN 1 POA 115 and transmits through RAN 1 POA 115.

Due to its mobility, MN 105 moves to an outer limit of coverage area 110, which happens to overlap with coverage area 120 of RAN 2 POA 125, which is a POA for a RAN different from the RAN of RAN 1 POA 115. At the outer limit of coverage area 110, a signal quality of transmissions to and from RAN 1 POA 115 drops and an overall data rate for MN 105 may also drop. Therefore, MN 105 may be better served by a different POA, such as RAN 2 POA 125. Therefore, MN 105 may participate in a handover from RAN 1 POA 115 to RAN 2 POA 125 in order to obtain improved performance. Both RAN 1 POA 115 and RAN 2 POA 125 may be connected to a core network 130 that allows access to services.

The ability to communicate with RAN 2 POA 125 can significantly shorten handover latency, as well as improve the probability of successful handover. However, since the RAN for RAN 1 POA 115 differs from the RAN of RAN 2 POA 125, a single radio cannot be used to communicate with both RAN 1 POA 115 and RAN 2 POA 125. Therefore, MN 105 needs at least two radios to communicate with both RAN 1 POA 115 and RAN 2 POA 125. Unfortunately, utilizing two or more radios simultaneously can dramatically increase power consumption as well as make signal filtering more difficult. Therefore, single radio operation may be attractive.

A device having multiple radios may perform single radio handover by restricting itself to operating at most one radio, e.g., transmitter, at a time. During a handover from a source radio network to a target radio network, the device may have a single radio tuned into the source radio access network, allowing the device full capability to transmit and receive only in the source radio access network. The device may have its other radio inactive.

In a revisiting of IEEE 802 architectures, a media independent control plane is being defined. However, significant portions, such as critical components have been omitted. As an example, service access points to higher layers of a multi-layer network model as well as mechanisms to support transport of link-layer frames using Internet Protocol (IP) transport are missing.

According to an example embodiment, a system and method for providing cross-layer encapsulation to enable media independent signaling for a device with a single active radio to communicate with a radio access network that its single active radio is not tuned to. As an example, the device may have its single active radio tuned to a source radio access network, but it may be able to utilize cross-layer encapsulation to enable signaling to communicate with another device in a target radio access network. Specifically, cross-layer encapsulation may provide IP transport of link-layer frames of the target radio access network via the source radio access network to make preparations for the handover, which generally reduces handover delay and improves handover success. Such a device may have multiple interfaces, with one or more interface per radio access network. However, at most one interface may have an active connection to its corresponding radio access network, i.e., the device has only one active radio. These devices, e.g., MNs, may perform handovers while avoiding higher power consumption and complex filter design typically involved with multiple active radios.

Figure 2:
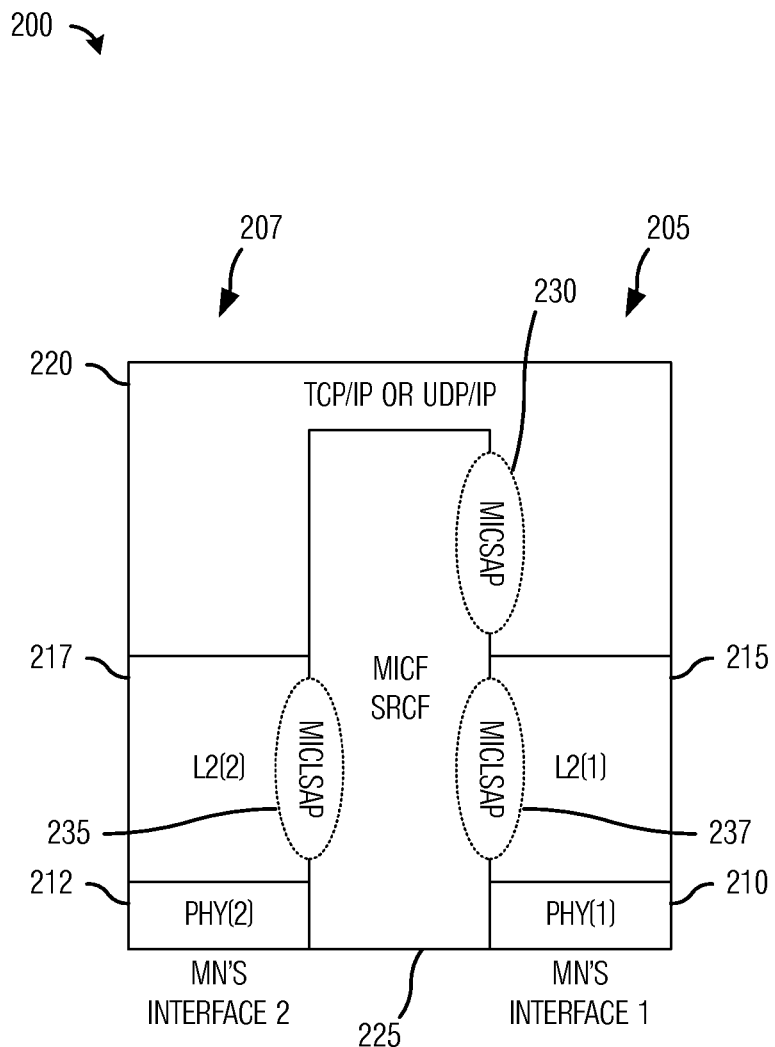
FIG. 2 illustrates an example detailed network layer view of a multiple radio interface MN of a communications system according to example embodiments described herein.

FIG. 2 illustrates a detailed network layer view of a multiple radio interface MN 200 of a communications system. MN 200 includes two radio interfaces: a first radio interface 205 and a second radio interface 207. Each radio interface includes network layer applications and processes that permit MN 200 to communicate, i.e., transmit, receive, and process packets, with devices operating in a radio access network that has an active connection with MN 200. First radio interface 205 includes a physical layer (PHY(1)) layer 210 and associated applications and processes, a layer 2 (L2(1)) layer 215 and associated applications and processes, as well as a transmission control protocol over IP (TCP/IP) or a user datagram protocol over IP (UDP/IP) layer 220 and associated applications and processes. It is noted that TCP/IP or UDP/IP layer 220 may be shared by both first radio interface 205 and second radio interface 207. Similarly, second radio interface 207 includes a physical layer (PHY(2)) layer 212 and associated applications and processes, and a layer 2 (L2(2)) layer 217 and associated applications and processes.

MN 200 also includes a media independent control function (MICF) and/or a single radio handover control function (SRCF) 225 that may be used to control movement of packets through MN 200 or controls movement of packets involved in a single radio handover. The MICF and/or SRCF may enable MN and a device in the target radio access network to exchange the network entry link-layer PDUs without depending on the existence of the target radio access network's physical channel. A service access point (SAP), may be used between a layer, such as a link-layer, and MICF/SRCF 225 to turn layer packets, such as link-layer packets, into media independent control frames. The media independent control frames may be provided to another SAP associated with another layer, such as a transport layer (for example, TCP/IP or UDP/IP layer 220) to allow the transport of the media independent control frames throughout the communications system using a transport protocol of the transport layer. As an example, MN 200 may then perform network entry signaling with a point of attachment (POA) in the target radio access network to prepare for a handover.

The SAPs between MICF/SRCF 225 and the link-layer and between MICF/SRCF 225 and the transport layer serve as an interface and provide a mechanism to enable cross-layer encapsulation to transport link-layer packets through IP-transport in a media independent control frame. An example embodiment system and method generally allow a MN, such as MN 200, to perform handover signaling with a target radio access network using IP signaling without requiring changes to the specific link-layer.

In general, to prepare for a handover, a MN uses a radio interface to exchange link-layer network entry packet data units (PDUs) with the POA of the target radio access network. In a multi-radio handover, the MN may use a radio interface with an active link to the target radio access network to exchange the network entry PDUs. However, in a single radio handover, the MN, such as MN 200, does not have a radio interface with an active link to the target radio access network. The MN may use MICF/SRCF 225, SAPs, and cross-layer encapsulation as presented herein to exchange the network entry PDUs with the POA of the target radio access network via a radio interface with an active link to the source radio access network. The network entry PDUs may be the same network entry PDUs that would be exchanged if the MN was performing a multi-radio handover.

A SAP, such as a media independent control link-layer service access point (MiCLSAP) 235 and 237, may serve as an interface between MICF/SRCF 225 and a link-layer, such as a L2(1) 215 and L2(2) 217. The SAP may turn link-layer (e.g., L2) packets originating in a first radio interface without an active radio connection into media independent control frames by a process known as encapsulation, producing frames that are operable by MICF/SRCF 225. As an example, L2 packets of L2(2) 217 may be encapsulated with a SRCF header to form a single radio control (SRC) frame, which may then be exchanged between MICF/SRCF 225 of MN 200 and another MICF/SRCF of a POA of the target radio access network via first radio interface 205 of MN 200 and its active connection to the source radio access network.

Another SAP, such as media independent control service access point (MICSAP) 230, may serve as an interface between MICF/SRCF 225 and a transport layer (e.g., TCP/IP or UDP/IP layer 220). MICF/SRCF 225 may be assigned a port number of a transport protocol, e.g., TCP or UDP, of the transport layer. Therefore, MICF/SRCF 225 of MN 200 may be able to exchange SRC frames with the MICF/SRCF of the POA of the target radio access network as long as there is a transport layer connection between it and the POA of the target radio access network. The SRC frames may be processed by the MICF/SRCF of the destination of the transport layer packets, i.e., the POA of the target radio access network, containing the SRC frames.

The SAP between the link-layer and MICF/SRCF 225, e.g., MiCLSAP 235 and 237, and the SAP between MICF/SRCF 225 and the transport layer (e.g., TCP/IP or UDP/IP layer 220), such as, MICSAP 230, provide a mechanism to enable cross-layer encapsulation to transport link-layer packets through the transport layer in media independent control frames. It is noted that although the discussion presented herein focuses on cross-layer encapsulation to allow an exchange of the link-layer and the transport layer packets, the embodiments presented herein may be operable between any two layers of the network layer stack.

Figure 3A:
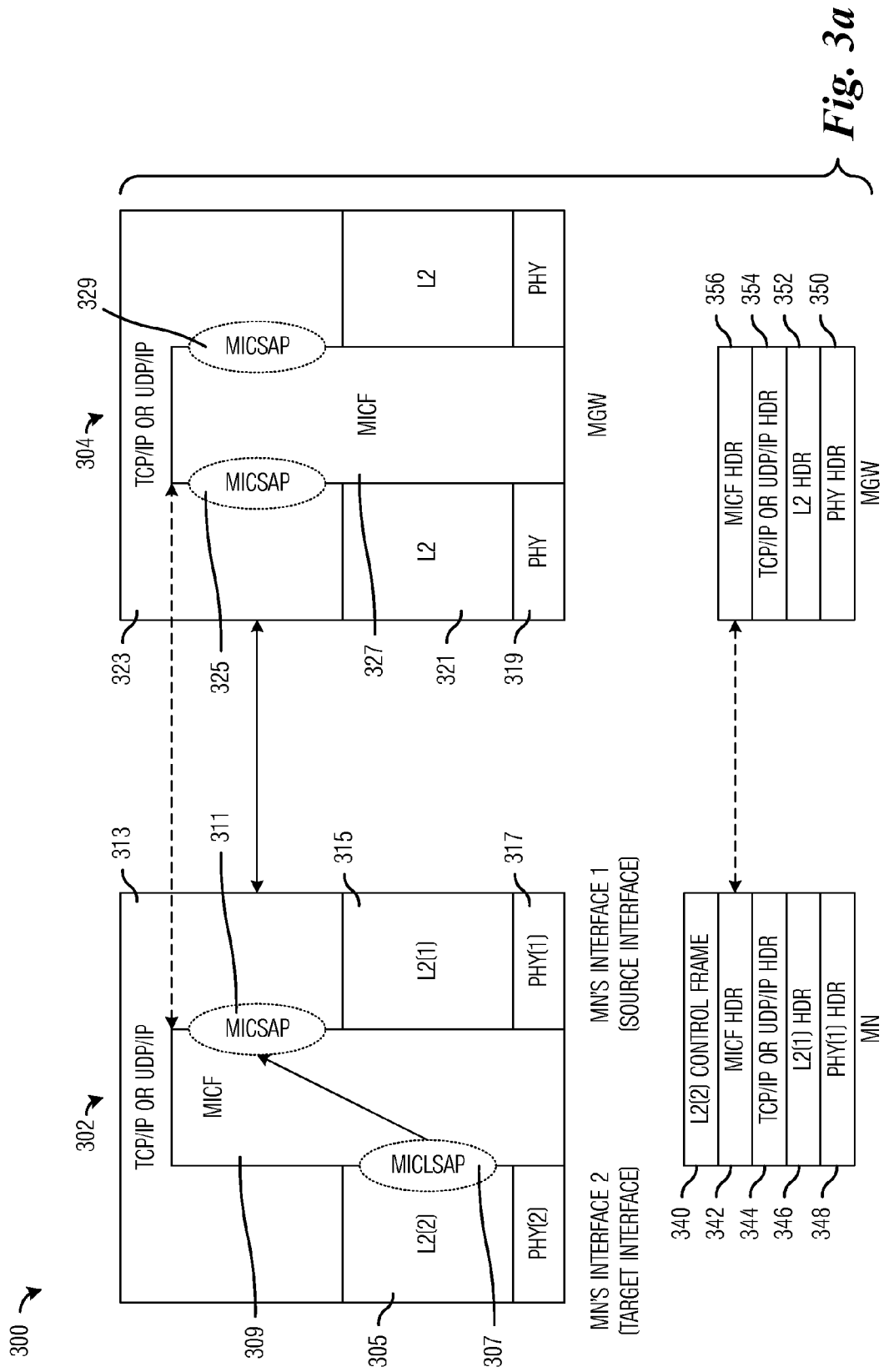
FIG. 3a illustrates an example communications network highlighting an example transport of a link-layer frame to a MGW according to example embodiments described herein.

FIG. 3a illustrates a communications network 300 highlighting an example transport of a link-layer frame to a mobility gateway (MGW). A MGW may be a gateway to bridge the mobility signaling between a MN and a target network via the source network. To the MN, the MGW acts like a virtual point of attachment (POA) to the target network. The MGW may enable such functions as pre-registration and proactive authentication of the MN. As shown in FIG. 3a, communications network 300 includes a layer view of a MN 302 and a layer view of a MGW 304. A link-layer frame, e.g., a layer 2 PDU, may originate in a link-layer, e.g., layer 2 (L2(2)), 305 of MN 302. The link-layer frame is in a format of the target radio access network of MN 302. However, MN 302 is lacking a physical connection, i.e., an active radio connection, to the target radio access network, so the link-layer frame may not be directly injected into the target radio access network.

Rather, a MiCLSAP 307 is used to encapsulate the layer 2 PDU into a media independent control frame. The layer 2 PDU becomes a payload of a source (SRC) frame in a MICF 309. It is noted that a SRCF is a particular form of MICF. Therefore, if the discussion is focused on a single radio handover, MICF 309 may be implemented as a SRCF. It is also noted that as used herein, MICF may refer to a SRCF. The media independent control frame with the layer 2 PDU included within is processed by MICF 309. Since a radio interface of MN 302 is tuned to a source radio access network, MN 302 is fully capable of transmitting and/or receiving TCP/IP or UDP/IP packets to and/or from the source radio access network, which in turn, has IP connectivity to the target radio access network by way of a communications network, such as the Internet. Hence, there is a TCP/IP or UDP/IP transport between a radio of MN 302 and a control-plane gateway (CGW) of the target radio access network via the radio interface of MN 302. MICF 309 of MN 302 may then communicate with a MICF of a POA in the target radio access network.

MICF 309 may also be used to support higher layer control messages. When a higher layer control message is passed to MICF 309, it is encapsulated with a media independent control frame header to become a media independent control frame, which may then use a transport layer protocol, such as TCP/IP or UDP/IP to reach a remote device. Therefore, the payload of the media independent control frame is a higher layer message when it is serving a higher layer, but it is also a lower layer frame when it is serving a lower layer. Bits in a header of the media independent control frame may be used to indicate a type of payload within the media independent control frame so that the media independent control frame is passed to a proper SAP.

A media independent control frame uses TCP/IP or UDP/IP to route from a MICF source (e.g., MN 302) to a MICF destination (e.g., MGW 304). If the MICF sender knows the IP address of the MICF destination, the MICF sender may make use of the IP address so that the destination of the IP packet(s) is also the MICF destination.

Logically, a direct connection exists between MICF 309 of MN 302 and a MICF, such as MICF 327, of MGW 304. The media independent control frame may follow a less direct path. MICF 309 may move the media independent control frame to a MICSAP 311, which serves as an interface between MICF 309 and TCP/IP or UDP/IP layer 313. The media independent control frame moves down to a link-layer, e.g., layer 2 (L2(1)), 315 and then a PHY layer, e.g., PHY(1), 317 onto a media to be received at MGW 304. The media independent control frame moves up to a PHY layer, e.g., PHY 319, and then a link-layer, e.g., L2, 321, and then a TCP/IP or UDP/IP layer 323. At TCP/IP or UDP/IP layer 323, it is delivered to a MICSAP 325 that interfaces between TCP/IP or UDP/IP layer 323 and MICF 327. The media independent control frame may then be delivered to an interface of MGW 304 appropriate for delivery to a POA of the target radio access network through a MICSAP 329.

A sequence of frames may be as follows: a link-layer frame 340 is encapsulated into a media independent control frame 342, which is converted into a TCP/IP or UDP/IP frame 344. TCP/IP or UDP/IP frame 344 is converted into a link-layer frame 346 and then a PHY frame 348. PHY frame 348 is received at MGW 304 as PHY frame 350 and converted into a link-layer frame 352 and then a TCP/IP or UDP/IP frame 354. TCP/IP or UDP/IP frame 354 is then converted into a media independent control frame 356.

Figure 3B:
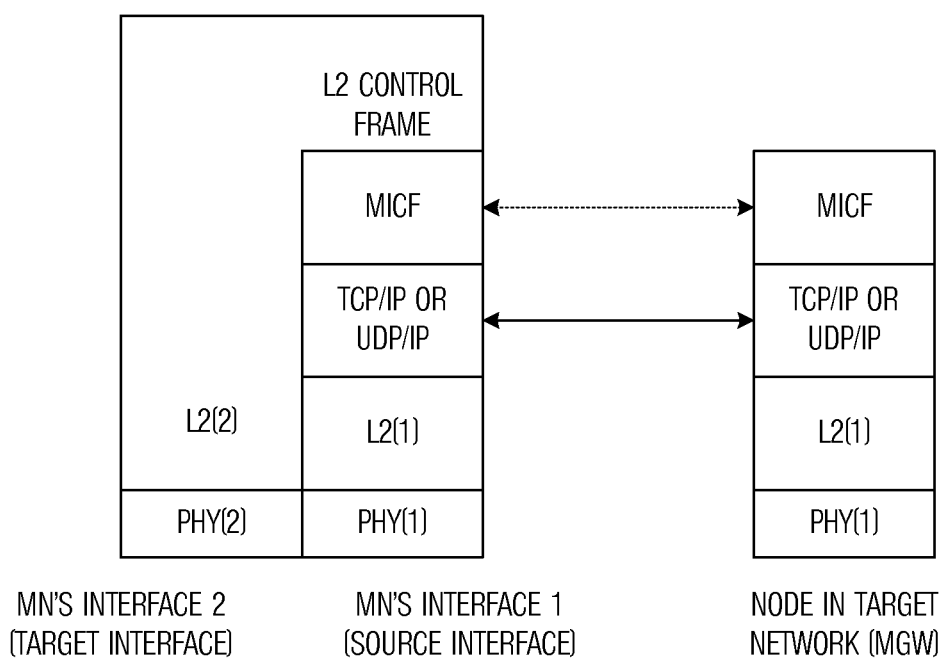
FIG. 3b illustrates an example communications system as shown in FIG. 3a highlighting an example cross-layer encapsulation resulting from the use of SAPs according to example embodiments described herein.

FIG. 3b illustrates a communications system 350 highlighting an example cross-layer encapsulation resulting from the use of SAPs. It is noted that communications system 350 corresponds to communications system 300 with the SAPs as shown in FIG. 3a.

It is noted that although the discussion focuses on a single link-layer frame and a single media independent control frame, the example embodiments discussed herein are operable with a plurality of link-layer frames and/or a plurality of media independent control frames. As an example, a single link-layer frame may be encapsulated by a MICSAP into a plurality of media independent control frames. Similarly, a plurality of link-layer frames may be encapsulated into a single media independent control frame. Therefore, the discussion of a single link-layer frame being encapsulated into a single media independent control frame should not be construed as being limiting to either the scope or the spirit of the example embodiments.

Figure 4A:
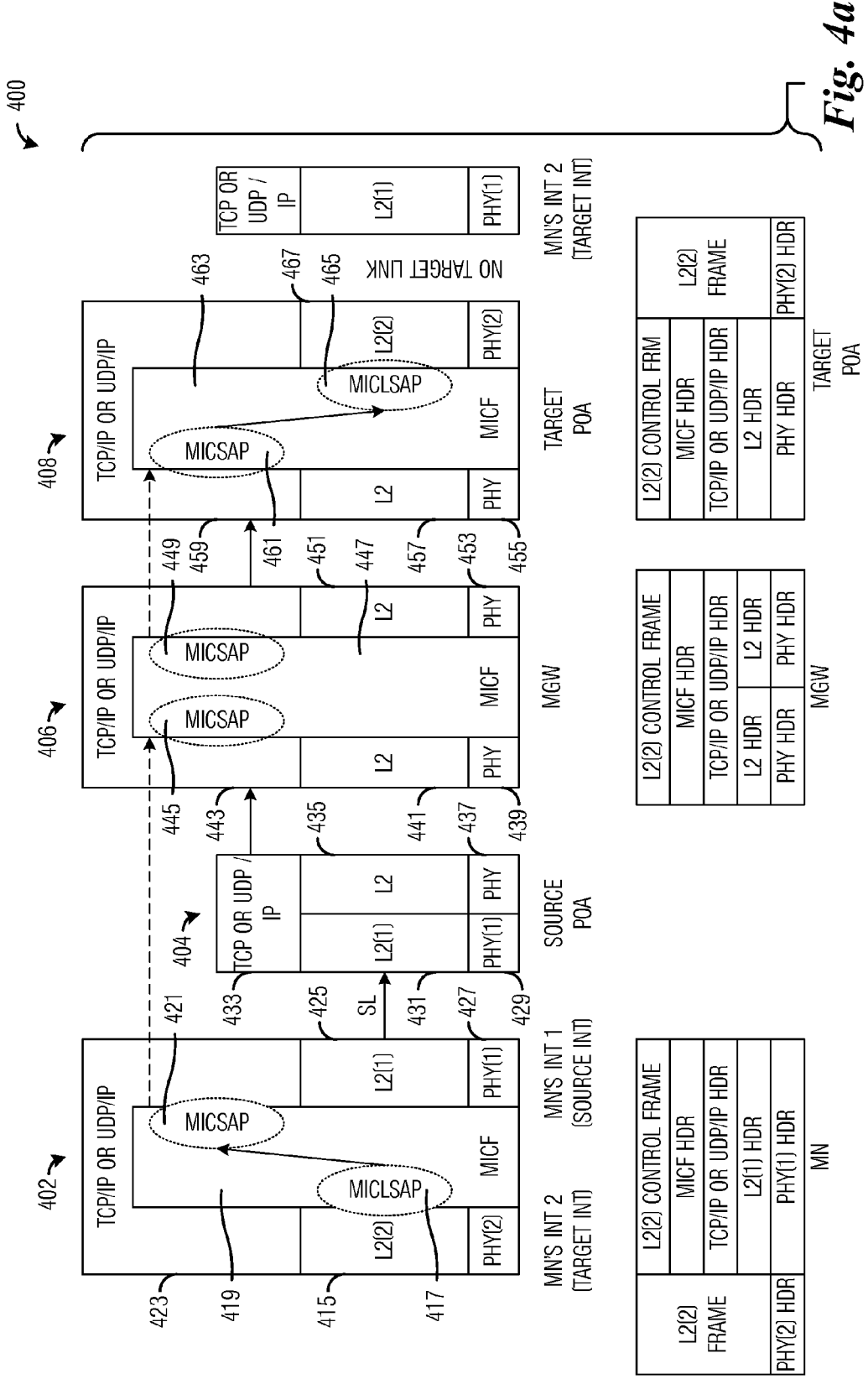
FIG. 4a illustrates an example communications network highlighting an example transport of a link-layer frame to a POA of a different radio access network according to example embodiments described herein.

FIG. 4a illustrates a communications network 400 highlighting an example transport of a link-layer frame to a POA of a different radio access network. As shown in FIG. 4a, communications network 400 includes a layer view of a MN 402, a source radio access network POA 404, a MGW 406, and a target radio access network POA 408. A link-layer frame, e.g., a layer 2 PDU, may originate in a link-layer, e.g., layer 2 (L2(2)), 415 of MN 402. The link-layer frame is in a format of the target radio access network of MN 402. However, MN 402 is lacking a physical connection to the target radio access network. Hence, the link-layer frame may not be directly injected into the target radio access network.

Instead, a MiCLSAP 417 is used to encapsulate the layer 2 PDU into a media independent control frame. The media independent control frame with the layer 2 PDU included within is processed by a MICF 419. Since a radio interface of MN 402 is tuned to a source radio access network, MN 402 is fully capable of transmitting and/or receiving TCP/IP or UDP/IP packets to and/or from the source radio access network, which in turn, has IP connectivity to the target radio access network by way of a communications network, such as the Internet. Hence, there is a TCP/IP or UDP/IP transport between a radio of MN 402 and a control-plane gateway (CGW) of the target radio access network via the radio interface of MN 402. MICF 419 of MN 402 may then communicate with a MICF of a POA in the target radio access network, e.g., target radio access network POA 408.

Logically, a direct connection exists between MICF 419 of MN 402 and a MICF, such as MICF 437, of MGW 406. The media independent control frame may follow a less direct path. MICF 419 may move the media independent control frame to a MICSAP 421, which serves as an interface between MICF 419 and TCP/IP or UDP/IP layer 423. The media independent control frame moves down to a link-layer, e.g., layer 2 (L2(1)), 425 and then a PHY layer, e.g., PHY(1), 427 onto a media to be received at source radio access network POA 404.

At source radio access network POA 404, which may not need to implement a MICF, a PHY layer 429 receives the media independent control frame, which moves to a link-layer, e.g., layer 2 (L2(1)), 431 and a TCP/IP or UDP/IP layer 433. The media independent control frame moves through a link-layer, e.g., layer 2 (L2), 435 and a PHY layer 427 as it exits source radio access network POA 404.

At MGW 406, the media independent control frame moves up to a PHY layer, e.g., PHY 439, and then a link-layer, e.g., L2, 441, and then a TCP/IP or UDP/IP layer 443. At TCP/IP or UDP/IP layer 443, it is delivered to a MICSAP 445 that interfaces between TCP/IP or UDP/IP layer 443 and MICF 447. The media independent control frame may then be delivered to an interface of MGW 406 appropriate for delivery to target radio access network POA 408 through a MICSAP 449. The media independent control frame moves through a link-layer, e.g., layer 2 (L2), 451 and a PHY layer 453.

At target radio access network POA 408, the media independent control frame moves up to a PHY layer, e.g., PHY 455, and then a link-layer, e.g., L2, 457, and then a TCP/IP or UDP/IP layer 459. At TCP/IP or UDP/IP layer 459, it is delivered to a MICSAP 461 that interfaces between TCP/IP or UDP/IP layer 459 and MICF 463. MICF 463 delivers the media independent control frame to a MiCLSAP 465, which may de-encapsulates (e.g., extracts) the link-layer frame from the media independent control frame, and provides it to a link-layer, e.g., layer 2 (L2(2)), 465 of target radio access network POA 408. It is noted that a radio interface of MN 402 for the target radio access network is replicated on the right most portion of FIG. 4a without an active radio link to illustrate the delivery of the link-layer frame with or without the active radio link. A sequence of frame is also shown in FIG. 4a.

As shown in FIG. 4a, if MN 402 knows the IP address of target radio access network POA 408, then there is communications between MICF 419 and MICF 463 using TCP/IP or UDP/IP transport. Therefore, source (SRC) frames may be exchanged between the two MICF.

The destination of the layer 2 PDU may be target radio access network POA 408. target radio access network POA 408 also includes MICF 463 with MICSAP 461 and MiCLSAP 465. When the TCP/IP or UDP/IP packet (the media independent control frame) reaches target radio access network POA 408, an appropriate field in the TCP/IP or UDP/IP packet indicates that its payload is a SRC frame and it is passed through MICSAP 461 to MICF 463 of target radio access network POA 408. The SRC frame may then be passed through MiCLSAP 465 to recover the original link-layer frame sent by MN 402.

The media independent control frame uses TCP/IP or UDP/IP transport, so the TCP/IP or UDP/IP packet is routed until it reaches a node having its destination IP address. The TCP/IP or UDP/IP packet may be processed only when it reaches its destination. Prior to reaching its destination, intermediate nodes do not need to implement MICF. However, in order to properly process the TCP/IP or UDP/IP packet containing the media independent control frame, the destination may need to support MICF.

The media independent control frame containing the lower-layer frame, such as the link-layer frame, uses TCP/IP or UDP/IP to route from a MICF source (e.g., MN 402) to a MICF destination (e.g., target radio access network POA 408). The source of the lower-layer frame (e.g., MN 402) may know the lower-layer identifier, e.g., a MAC address, of the destination of the lower-layer frame (e.g., target radio access network POA 408), but it may not know the IP address of the destination. The source may send the media independent control frame containing the lower-layer frame to an intermediate destination, such as a proxy. The intermediate destination may be the TCP/IP or UDP/IP destination of the TCP/IP or UDP/IP packet but it is not the final destination of the media independent control frame.

As shown in FIG. 4a, if MN 402 does not know the IP address of target radio access network POA 408, the link-layer frame may have an identification, such as link-layer identification, of target radio access network POA 408 in order to support a network entry procedure. The SRC frame may be sent as a payload of a TCP/IP or UDP/IP packet destined for MGW 406. The SRC frame may contain information for the target radio access network to identify target radio access network POA 408. MGW 406 may determine the IP address of target radio access network POA 408 and use the IP address as the destination address of a TCP/IP or UDP/IP packet containing the SRC frame as a payload to forward the SRC packet to target radio access network POA 408. In other words, MGW 406 operates like a proxy for MN 402 to send target radio access network layer 2 network entry packets to target radio access network POA 408. Replies from target radio access network POA 408 to MN 402 are transported in a similar manner.

Figure 4B:
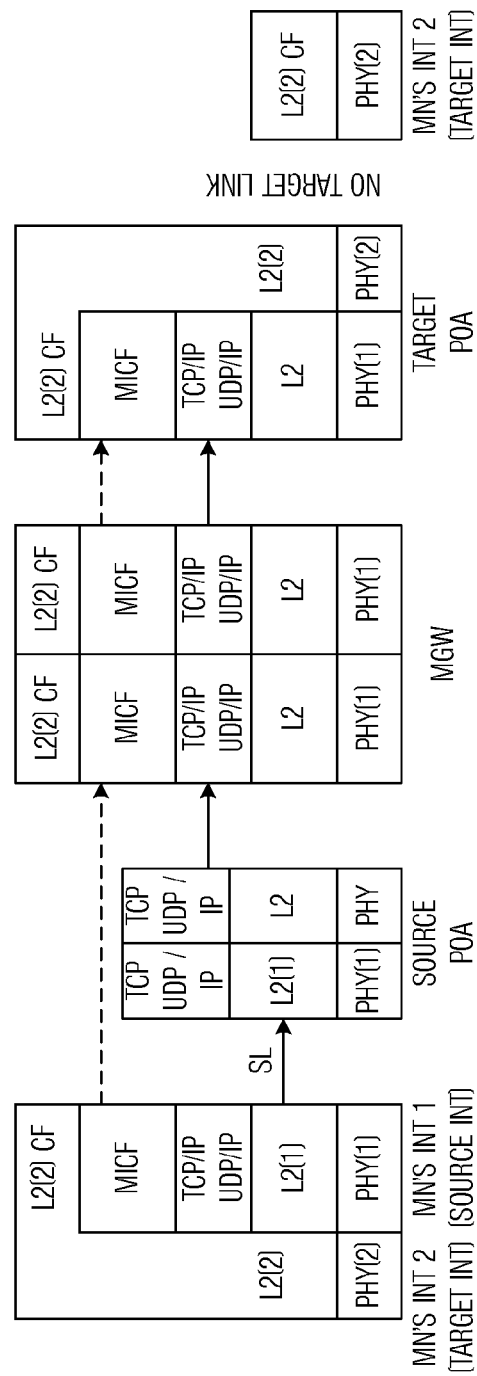
FIG. 4b illustrates an example communications system as shown in FIG. 4a highlighting an example cross-layer encapsulation resulting from the use of SAPs according to example embodiments described herein.

FIG. 4b illustrates a communications system 450 highlighting an example cross-layer encapsulation resulting from the use of SAPs. It is noted that communications system 450 corresponds to communications system 400 with the SAPs as shown in FIG. 4a.

It is noted that although the discussion focuses on a single link-layer frame and a single media independent control frame, the example embodiments discussed herein are operable with a plurality of link-layer frames and/or a plurality of media independent control frames. As an example, a single link-layer frame may be encapsulated by a MICSAP into a plurality of media independent control frames. Similarly, a plurality of link-layer frames may be encapsulated into a single media independent control frame. Therefore, the discussion of a single link-layer frame being encapsulated into a single media independent control frame should not be construed as being limiting to either the scope or the spirit of the example embodiments.

According to an example embodiment, a control plane having SAPs points to a lower layer, e.g., a link-layer, and to a higher layer. Additionally, media independent control frames are provided. Devices in different radio access networks may adopt the same media independent control function. Then, even though the lower layer frames may be media (access network) specific, when encapsulated into media independent control frames, they are no longer media specific.

According to an example embodiment, SAPs perform cross-layer encapsulation to enable lower layers, e.g., link-layer, frames to use TCP/IP or UDP/IP packets to enable transport using IP communications with a remote device.

According to an example embodiment, MICF cross-layer encapsulation is provided. The media independent control frames may serve any layer in any access network. In addition to supporting communications with lower layer frames, the MICF may also support communications with higher layer frames. In other words, the payload of a media independent control frame may be a frame from any layer. Bits in the media independent control frame header may indicate the type of the payload so that the MICF can process the media independent control frame accordingly.

According to an example embodiment, any layer in a first device may communicate with any layer in a different device to which the first device has IP connectivity. According to an example embodiment, a MICF proxy is provided. When utilizing MICF to support communications with lower layer packets using TCP/IP or UDP/IP transport, an intermediate IP destination may not be the same as a final destination of the lower layer frame. As an example, the source of the lower layer packets only knows the lower layer address but not the IP address of the final destination. In such a situation, the IP packet may be sent first to a proxy. The proxy may be capable of finding the IP address of the final destination according to the lower layer identification information, so the proxy may create another TCP/IP or UDP/IP packet to send the lower layer packet to the final destination.

According to an example embodiment, the proxy from the link-layer of a source device is used to communicate to a target POA although it lacks the IP address of the target POA. Cross-layer encapsulation and indicator bits in the header of media independent control frames may be used to enable proxy operation.

Figure 5:
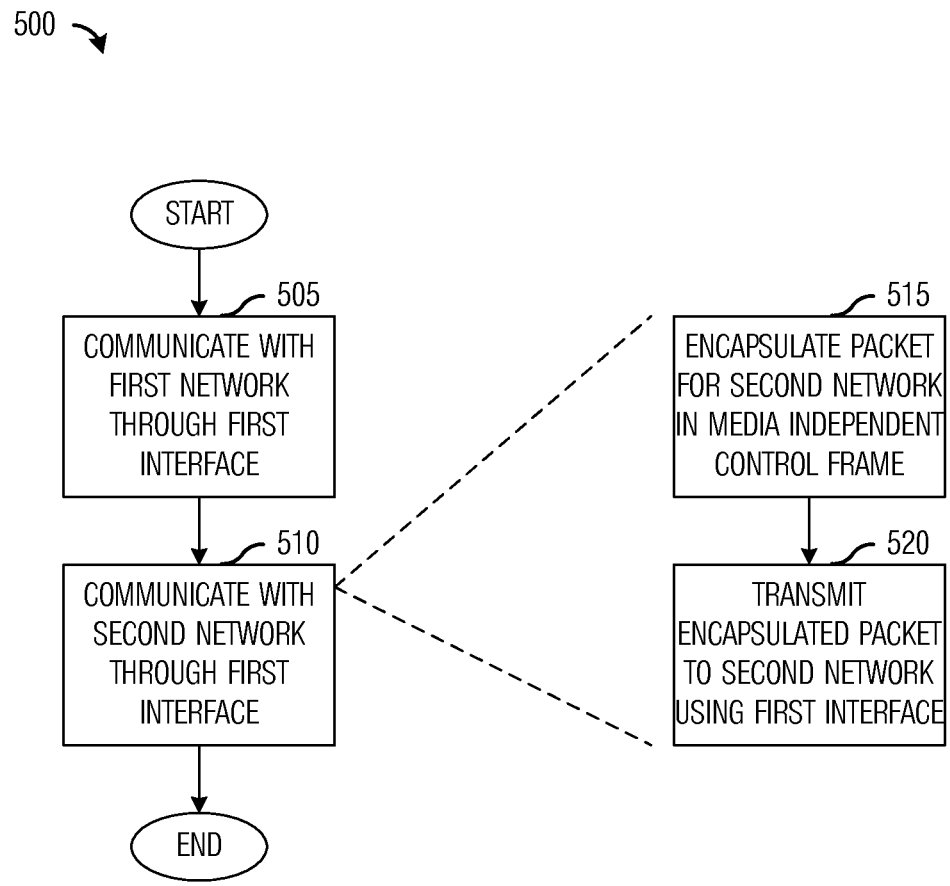
FIG. 5 illustrates an example flow diagram of operations in a MN as the MN communicates with POAs in a first radio access network and a second radio access network through a single radio interface with a single active radio connection according to example embodiments described herein.

FIG. 5 illustrates a flow diagram of operations 500 in a MN as the MN communicates with POAs in a first radio access network and a second radio access network through a single radio interface with a single active radio connection. Operations 500 may be indicative of operations occurring in a MN, such as MN 200, MN 302, and MN 402, as the MN communicates with POAs in a first radio access network and a second radio access network through a single radio interface with a single active radio connection.

Operations 500 may begin with the MN communicating with a POA in the first radio access network (block 505). Since the MN has a radio interface with an active radio connection to the first radio access network, the MN may readily transmit and/or receive communications to and/or from the POA in the first radio access network.

The MN may also communicate with a POA in the second radio access network (block 510). However, since the MN has only one active radio connection and it is tuned to the first radio access network, the MN may not directly transmit and/or receive communications to and/or from the POA in the second radio access network. Instead, the MN may make use of cross-layer encapsulation of frames for the POA in the second radio access network and media independent control frames to enable the use of the active radio connection with the first radio access network to communicate with the POA in the second radio access network.

In order to use cross-layer encapsulation of frame(s) intended for the POA in the second radio access network, a SAP, e.g., a MiCLSAP, in the MN may encapsulate frame(s) from the MN that is intended for the POA in the second radio access network in a media independent control frame(s) (block 515). The encapsulation of the frame(s) to produce the media independent control frame(s) produces frames that are independent of either the first radio access network or the second radio access network. In other words, the media independent control frame(s) are routable in devices of either radio access network as long as a MICF is implemented in the devices. The encapsulation of the frame(s) from the MN that is intended for the POA in the second radio access network may allow for the movement of the frame(s) from a first layer to a second layer. The media independent control frame(s) may be transmitted to the POA of the second radio access network using the radio interface with the active radio connection to the first radio access network (block 520). The encapsulated frame(s) may be inserted into a second layer of the radio interface with the active radio connection to the first radio access network using another SAP, e.g., a MICSAP. The media independent control frame(s) arrive at a MGW prior to arriving at the POA of the second radio access network.

FIG. 6 illustrates a flow diagram of operations 600 in a MGW as the MGW participates in communications with a MN as the MN communicates with POAs in a first radio access network and a second radio access network through a single radio interface with a single active radio connection. Operations 600 may be indicative of operations occurring in a MGW, such as MGW 304 and MGW 406, as the MGW participates in communications with a MN as the MN communicates with POAs in a first radio access network and a second radio access network through a single radio interface with a single active radio connection.

Operations 600 may begin with the MGW receiving a media independent control frame(s) that includes a link-layer frame(s) or link-layer subframe(s) encapsulated therein (block 605). The link-layer frame(s) or link-layer subframe(s) may be intended for a POA of a radio access network that differs from one that the MGW uses. The MGW may forward the media independent control frame(s) to the POA of the radio access network using a MICF (block 610). SAPs, such as MICSAP 445 and MICSAP 449, operating as interfaces may facilitate the moving of the media independent control frame(s) from an input protocol stack of the MGW to an output protocol stack of the MGW via a MICF.

FIG. 7 illustrates a flow diagram of operations 700 in a target POA as the target POA participates in communications with a MN as the MN communicates with POAs in a first radio access network and a second radio access network through a single radio interface with a single active radio connection. Operations 700 may be indicative of operations occurring in a target POA, such as POA 408, as the target POA participates in communications with a MN as the MN communicates with POAs in a first radio access network and a second radio access network through a single radio interface with a single active radio connection.

Operations 700 may begin with the target POA receives a media independent control frame(s) from a MGW (block 705). The media independent control frame(s) may include a frame(s) or subframe(s) of a first layer, e.g., a link-layer frame(s) or link-layer subframe(s), encapsulated therein. The media independent control frame(s) originated at a MN having a radio interface tuned to a first radio access network that differs from a second radio access network that includes the target POA. A SAP, such as MICSAP, serving as an interface may facilitate the moving of the media independent control frame(s) to a MICF. The MICF may be used to facilitate a layer change for the media independent control frame(s), e.g., the media independent control frame(s) may move from the first layer to a second layer using the MICF. Another SAP, such as a MiCLSAP, in the target POA de-encapsulates the frame(s) or subframe(s), e.g., the link-layer frame(s) or the link-layer subframe(s) for the target POA, from the media independent control frame(s) (block 710). The link-layer frame(s) or the link-layer subframe(s) for the target POA may be provided to an appropriate layer and its associated process, such as a layer 2 process, for processing (block 715).

Figure 8:
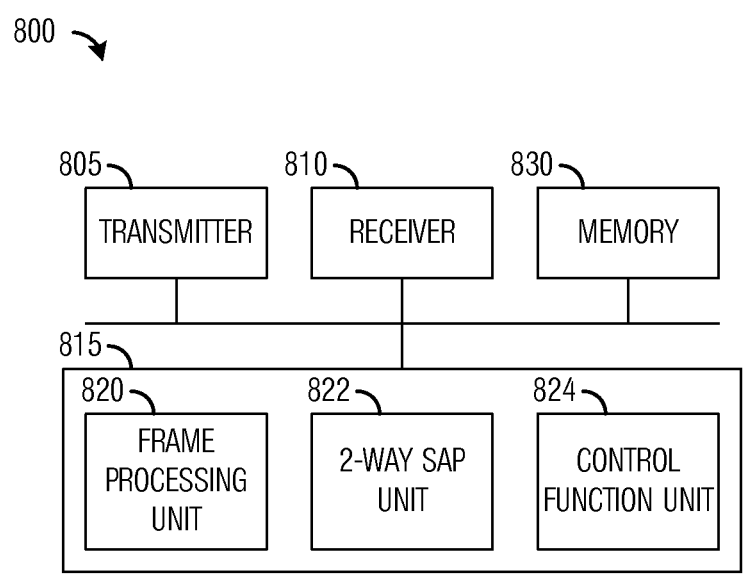
FIG. 8 illustrates an example communications device according to example embodiments described herein.

FIG. 8 provides an illustration of a communications device 800. Communications device 800 may be an implementation of a device, such as a MN, a POA, and the like, or a controller, such as a MGW, and the like. Communications device 800 may be used to implement various ones of the embodiments discussed herein. As shown in FIG. 8, a transmitter 805 is configured to send packets, frames, and/or signals and a receiver 810 is configured to receive packets, frames, and/or signals. Transmitter 805 and receiver 810 may have a wireless interface, a wireline interface, or a combination thereof.

A frame processing unit 820 is configured to manipulate frames, such as adding and/or removing parts, such as headers, footers, control information, and the like, forward frames, receive frames, and the like. A two-way SAP unit 822 is configured to change a format of a frame by encapsulating a frame or de-encapsulating a frame. As an example, two-way SAP unit 822, serving as an interface, encapsulates a link-layer frame routable in only its particular radio access network to convert it into a media independent control frame, which is routable in a number of radio access networks. As another example, two-way SAP unit 822, serving as an interface, de-encapsulates a media independent control frame to convert it into a link-layer frame. Two-way SAP unit 822 is also configured to move a media independent control frame to and from a MICF. A control function unit 824 is configured to control movement of a media independent control frame. Control function unit 824 implements a MICF, such as a SRCF. As an example, control function unit 824 moves a media independent control frame from a first layer of a first protocol stack to a second layer of a second protocol stack. A memory 830 is configured to store link-layer frames, media independent control frames, headers, footers, control information, frame processing information, and so on.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while frame processing unit 820, two-way SAP unit 822, and control function unit 824 may be software modules executing in a processor 815, a microprocessor, a custom circuit, or a custom compiled logic array of a field programmable logic array. Frame processing unit 820, two-way SAP unit 822, and control function unit 824 may be stored as modules in memory 830.

Although the present disclosure and its advantages have been described in detail, it should be understood that various changes, substitutions and alterations can be made herein without departing from the spirit and scope of the disclosure as defined by the appended claims.

What is claimed is:

1. A method for mobile node operations, the method comprising:
   establishing, by a mobile node, a first radio interface having:
      a transport layer;
      a first link layer below the transport layer, and
      a first physical layer below the first link layer and having an active connection to a first point of attachment in a first radio network;
   communicating, by the mobile node, with the first point of attachment in the first radio network through the first radio interface tuned to the first radio network;
   determining to participate in a handover from the first point of attachment to a second point of attachment in a second radio network;
   establishing, by the mobile node, a second radio interface having:
      a second link layer to communicate with the second point of attachment in the second radio network, and
      a second physical layer below the second link layer, wherein the second physical layer does not communicate with the second point of attachment prior to the handover;
   encapsulating, by the mobile node, a first link-layer frame from the second link layer in the second radio interface within a media independent control frame; and
   transmitting, by the mobile node, the media independent control frame with the first link-layer frame from the second link layer in the second radio interface encapsulated therein to the second point of attachment in the second radio network using the transport layer of the first radio interface tuned to the first radio network.

2. The method of claim 1, wherein a first service access point is used to encapsulate the first link-layer frame from the second link layer in the second radio interface within the media independent control frame.

3. The method of claim 2, wherein the first service access point is a two-way service access point.

4. The method of claim 2, wherein the first service access point is a media independent control link-layer service access point.

5. The method of claim 1, wherein the media independent control frame is transmitted to a mobility gateway.

6. The method of claim 1, wherein the media independent control frame is a higher layer control frame.

7. The method of claim 6, wherein the media independent control frame is a transport layer control frame.

8. The method of claim 7, wherein the media independent control frame is one of a transaction control protocol over internet protocol frame and a user datagram protocol over internet protocol frame.

9. The method of claim 1, wherein the media independent control frame is routable in the first radio network and the second radio network.

10. The method of claim 1, further comprising a media independent control function moving the media independent control frame from the first second link layer of the second radio interface of the mobile node to the transport layer of the first radio interface of the mobile node.

11. The method of claim 10, wherein the media independent control function comprises a single radio handover control function.

12. The method of claim 1, wherein a second service access point is used to insert the media independent control frame into the transport layer of the first radio interface tuned to the first radio network.

13. The method of claim 12, wherein the second service access point is a two-way service access point.

14. The method of claim 12, wherein the second service access point is a media independent control service access point.

15. A method for operating a target point of attachment in a target radio network, the method comprising:
   establishing, by the target point of attachment, a first communications interface having:
      a transport layer;
      a first link layer below the transport layer, and
      a first physical layer below the first link layer;
   receiving, by the target point of attachment using the transport layer of the first communications interface, a media independent control frame with a mobile link-layer frame encapsulated therein, wherein the media independent control frame is received, via a source point of attachment in a source radio network, from a mobile link layer in a source radio interface of a mobile node tuned to the source radio network;
   de-encapsulating, by the target point of attachment, the media independent control frame to obtain the mobile link-layer frame;
   determining to participate in a handover of the mobile node from the source point of attachment to the target point of attachment;
   establishing, by the target point of attachment, a target radio interface having:
      a target link layer, and
      a target physical layer below the target link layer; and
   moving the mobile link-layer frame from the transport layer of the first communications interface to the target link layer of the target radio interface, wherein the target physical layer does not communicate with the mobile node prior to the handover.

16. The method of claim 15, further comprising processing the mobile link-layer frame.

17. The method of claim 16, wherein a link-layer process is used to process the mobile link-layer frame.

18. The method of claim 15, wherein a first service access point is used to de-encapsulate the media independent control frame.

19. The method of claim 18, wherein the first service access point is a two-way service access point.

20. The method of claim 18, wherein the first service access point is a media independent control link-layer service access point.

21. The method of claim 15, wherein a second service access point is used to move the media independent control frame from the transport layer of the first communications interface.

22. The method of claim 21, wherein the second service access point is a two-way service access point.

23. The method of claim 21, wherein the second service access point is a media independent control service access point.

24. The method of claim 15, wherein a media independent control function is used to move the media independent control frame from the first layer of the multiple layer protocol stack of the target point of attachment to the second layer of the multiple layer protocol stack of the target point of attachment.

25. A mobile node comprising:
   a receiver configured to communicate with a first point of attachment in a first radio network through a first radio interface tuned to the first radio network;

a transmitter configured to communicate with the first point of attachment in the first radio network through the first radio interface tuned to the first radio network, and to transmit a media independent control frame with a first link-layer frame from a second link layer in a second radio interface encapsulated therein to a second point of attachment in a second radio network using a transport layer of the first radio interface tuned to the first radio network; and a processor operatively coupled to the receiver and to the transmitter, the processor configured to establish the first radio interface having:
the transport layer;
a first link layer below the transport layer, and
a first physical layer below the first link layer and having an active connection to the first point of attachment in the first radio network;

determine to participate in a handover from the first point of attachment to the second point of attachment in the second radio network;

establish a second radio interface having:
a second link layer to communicate with the second point of attachment in the second radio network, and a second physical layer below the second link layer, wherein the second physical layer does not communicate with the second point of attachment prior to the handover; and encapsulate the first link-layer frame in the second radio network format from the second link layer in the second radio interface within the media independent control frame.

26. The mobile node of claim 25, wherein the processor comprises a service access point configured to encapsulate the first link-layer frame from the second link layer in the second radio interface within the media independent control frame.

27. The mobile node of claim 26, wherein the service access point is a two-way service access point.

28. The mobile node of claim 26, wherein the service access point is a media independent control link-layer service access point.

29. The mobile node of claim 25, wherein the media independent control frame is a transport layer control frame.

30. The mobile node of claim 25, wherein the processor comprises a media independent control function to move the media independent control frame from the second link layer of the second radio interface of the mobile node to the transport layer of the first radio interface of the mobile node.

* * * * *

UNITED STATES PATENT AND TRADEMARK OFFICE
CERTIFICATE OF CORRECTION

PATENT NO. : 9,191,990 B2  Page 1 of 1
APPLICATION NO. : 13/612682
DATED : November 17, 2015
INVENTOR(S) : Chan et al.

It is certified that error appears in the above-identified patent and that said Letters Patent is hereby corrected as shown below:

In the claims

Col. 13, line 58, claim 10, delete "first".

Col. 16, lines 5 - 6, claim 25, delete "in the second radio network format".

Signed and Sealed this
First Day of March, 2016

Michelle K. Lee
*Director of the United States Patent and Trademark Office*